INVENTORS.
CHARLES N. WINNICK &
JUDD C. POSNER
ATTORNEY

United States Patent Office 3,803,212
Patented Apr. 9, 1974

3,803,212
MONO-(BETA-ACETOXYETHYL) TEREPHTHALATE AND PROCESS
Charles N. Winnick, Teaneck, and Judd C. Posner, Hackensack, N.J., assignors to Halcon International, Inc.
Continuation-in-part of applications Ser. No. 139,083 and Ser. No. 139,179, both Apr. 30, 1971, Ser. No. 159,019, July 1, 1971, and Ser. No. 41,653, May 28, 1970, all now abandoned. This application Nov. 26, 1971, Ser. No. 202,382
Int. Cl. C07c 69/82
U.S. Cl. 260—475 P
3 Claims

ABSTRACT OF THE DISCLOSURE

The present invention provides the monoacetate ester of mono-(beta-hydroxyethyl) terephthalate as a new compound.

CROSS REFERENCE TO RELATED APPLICATIONS

Figure 1:
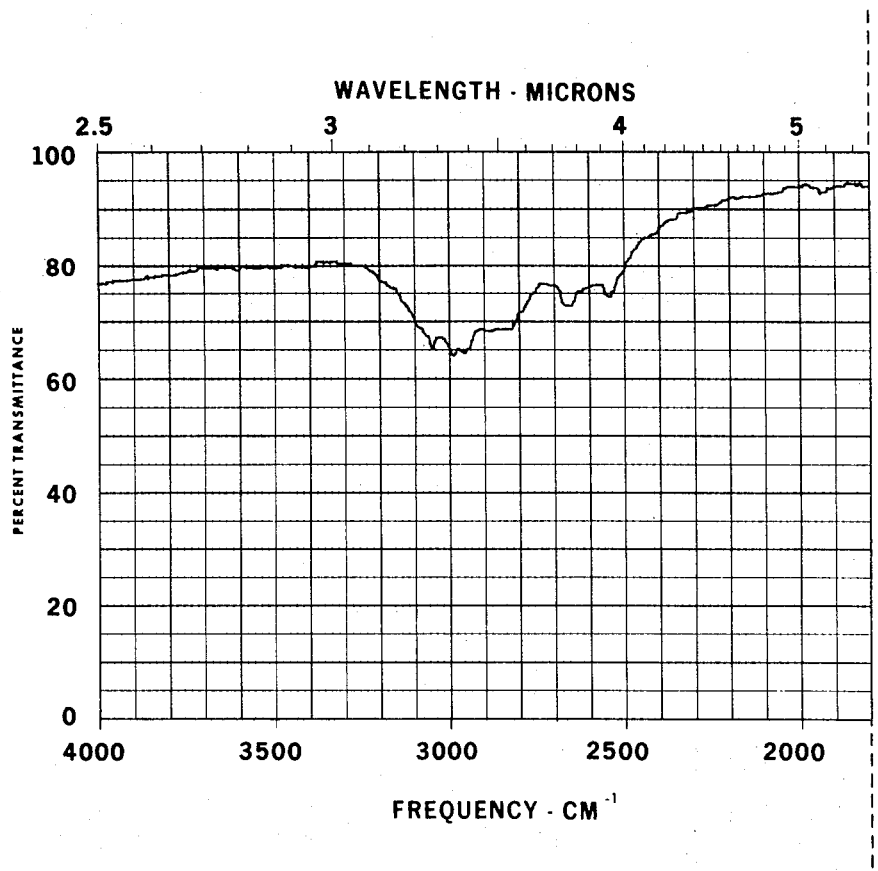

This application is a continuation-in-part of co-pending applications Ser. Nos. 139,083 and 139,179, both filed Apr. 30, 1971, of co-pending application Ser. No. 159,019, filed July 1, 1971, now abandoned and of co-pending application Ser. No. 41,653, filed May 28, 1970, now abandoned.

Lower carboxylate diesters of bis-(beta-hydroxyethyl) terephthalate, i.e. bis-(beta-acyloxyethyl) terephthalates, have potential value in the production of polyesters. It is known, for example, as described in British Pat. 760,125, to prepare polyesters directly from the lower carboxylate diesters of bis-(beta-hydroxyethyl) terephthalate. The methods employed in British Pat. 760,125 for preparing such bis-(beta-acyloxyethyl) terephthalates involve the production of bis-(beta-hydroxyethyl) terephthalate and subsequently the reaction of this material with an acyl chloride. A similar approach is disclosed in U.S. Pat. 1,733,639 for the preparation of esters of phthalic acid, viz. esters of bis-(beta-hydroxyethyl) phthalate, employing a carboxylic acid as the reactant, and this patent also refers to a modified procedure involving the use of phthalic anhydride. Belgian Pat. 742,175 discloses the preparation of lower carboxylate diesters of bis-(beta-hydroxyethyl) terephthalate by a catalytic reaction between terephthalic acid and a lower carboxylate diester of ethylene glycol, with the liberated carboxylic acid being removed as formed.

It is the object of this invention to provide a novel terephthalate ester.

In accordance with the present invention, there is provided the mono-acetate ester of mono-(beta-hydroxyethyl) terephthalate, i.e. mono-(beta-acetoxyethyl) terephthalate, which has the following structural formula:

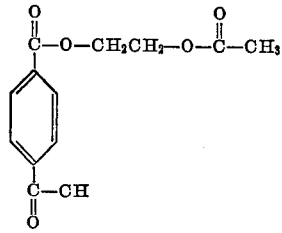

This compound, which has both an acetoxy moiety and a carboxylic moiety, is useful for the production of polyester resins, either alone or in combination with the diacetate of bis-(beta-hydroxyethyl( terephthalate, and can also be used to prepare the last named diacetate.

The mono-(beta-acetoxyethyl) terephthalate of the invention can be effectively produced by reacting terephthalic acid with acetate esters of ethylene glycol under conditions such that the acetic acid which is liberated in the course of the reaction, which is an acidolysis, is retained in the reaction zone and preferably, the reaction is carried out in the presence of added acetic acid. This is to be distinguished from the acidolysis process disclosed in Belgian Pat. 742,175 wherein acetic acid is removed as it is liberated and the product of the reaction is the diacetate of beta-(hydroxyethyl) terephthalate, i.e. bis-(beta-acetoxyethyl) terephthalate, which has the formula:

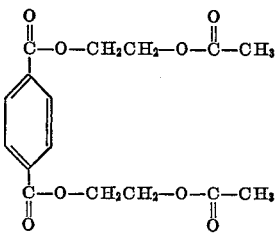

When the reaction is carried out without removal of the acetic acid or in the presence of added acetic acid, some of the diacetate is also formed but the monoacetate, i.e. mono-(beta-acetoxyethyl) terephthalate, is produced in significant quantities and in some cases is the major product. This reaction between the terephthalic acid and the acetate esters of ethylene glycol is carried out in the liquid phase at reaction temperatures between 100° C. and 350° C. When reaction temperatures are below 220° C. it is additionally necessary to employ an acidic catalyst; however, when employing reaction temperatures above this level, no catalyst is necessary and normally would not be employed.

The monoacetate of ethylene glycol or the diacetate of ethylene glycol can be employed as the ester reactants in the acidolysis reaction, but mixtures of the monoacetate and diacetate are highly effective and provide a particularly smooth reaction. The diacetate esters of ethylene glycol as commercially produced frequently contain some mono-ester and, in some cases, contain small amounts of ethylene glycol. In producing the compound of this invention such commercially prepared dicarboxylic esters of ethylene glycol are advantageously used. Indeed, mixtures of the ethylene glycol mono- and di-acetates containing up to 50 mol percent of the mono-ester are highly suitable, and mixtures with up to 80 mol percent of the mono-ester are effectively employed. A particularly useful mixture contains 10 to 30 mol percent of the mono-ester. In general, when mixtures are employed they contain at least about 3 mol percent of the mono-ester. The ethylene glycol which may be present is ordinarily not objectionable but generally amounts greater than 25 mol percent are not desirable for economic reasons.

Not only does non-removal of the liberated acetic acid lead to the formation of the desired mono-(beta-acetoxyethyl) terephthalate but satisfactory conversions (conversion meaning mols of terephthalate ester products formed per mol of terephthalic acid fed) are also achieved. It has been found that conversions greater than 90% are readily obtained. Of course, it is necessary at some stage to remove the acid co-product in order to recover concentrated carboxylate ester product and this is readily done after completion of the reaction. Any co-product water which may be formed will ordinarily be removed along with the acid. As previously mentioned, in order to increase the quantity of mono-(beta-acetoxyethyl) terephthalate produced in relation to the diester, acetic acid is suitably added to the reaction mixture in varying quantities, e.g. up to a molar quantity equal to 10 times the molar quantity of ethylene glycol esters fed to the system, and molar quantities of 1 to 8 times the ester feed are preferably used.

As earlier indicated, the use of catalysts is not uniformly required for the conduct of the above described process for producing mono-(beta-acetoxyethyl) terephthalate. Whether or not a catalyst is to be employed depends primarily upon the reaction temperature used in this process. At reaction temperatures below 220° C. a catalyst is required and this catalyst is suitably an acidic catalyst. At temperatures above about 220° C. catalysts are not required although they may be used if so desired. When acidic catalysts are employed, either Bronsted or Lewis acids can be used. Illustrative of the Bronsted type acids are sulfuric acid, phosphoric acid, methanesulphonic acid, fluosulfonic acid, dihydroxyfluoboric acid, hydrochloric acid, toluenesulfonic acid, sulfonic acid-containing cation exchange resins, and the like. Illustrative Lewis acids are boron trifluoride, aluminum trichloride, antimony pentafluoride, zinc chloride and the like. Such acids are well known types and additional examples can be found, for example, in "Physical Organic Chemistry" by Jack Hine (1962—McGraw-Hill Company, New York) and in "Friedel-Crafts and Related Reactions" by George A. Olah, vol. 1 (1963—Interscience Publishers, New York).

When a catalyst is used, its concentration can be varied over a wide range. Generally, concentrations by weight based on the total reaction mixture of 0.001% to 20% are illustrative with concentrations of 0.01 to 5% being preferred and concentrations of 0.1 to 2% being most advantageously employed in most cases.

The reaction is of the multi-phase type. In view of the very limited solubility of terephthalic acid, the terephthalic acid is suspended in finely divided form in the reaction mixture during the reaction. Use of solvents is not preferred although inert solvents such as hydrocarbons, e.g. hexane, ethers, e.g. dioxane, sulfones, nitrated aryls and the like, can be employed. In addition, any of the liquids reactants, including the acetic acid, can serve as solvents or suspending media. Normally, it is preferred to suspend the terephthalic acid in finely divided form in a liquid body comprising the esters of ethylene glycol together with a catalyst, if used, as the reaction system. Either batch or continuous operations can be employed.

Suitable reaction conditions normally involve temperatures ranging from about 100° C. to about 350° C. Although temperatures outside this range can be employed, temperatures below 100° C. usually result in undesirably low reaction rates while temperatures above about 350° C. risk thermal decomposition. When catalysts are used, the preferred temperature range is 140° C. to 220° C. and the most desirable range is 175° C. to 200° C. When catalysts are not employed, temperatures from about 220° C. to 350° C. can be used with preferred temperatures being from about 230° C. to about 300° C. and temperatures from about 240° C. to about 275° C. being especially preferred. The pressure maintained on the reaction mixture is sufficient to provide a liquid reaction mixture phase and, apart from this, is in no way critical. Illustrative pressures range from about 5 to 500 p.s.i.a. with pressures close to atmospheric, e.g. 14 to 50 p.s.i.a., being preferred.

The reaction times are, of course, a function of temperature and, when a catalyst is used, its type and concentration. Reaction times for a particular case can readily be determined by routine experimentation whereby skilled persons can ascertain the necessary time to reach the desired conversion. Illustrative reaction times range from about 10 minutes to about 24 hours, with times of 0.5 to 10 hours being most usually employed.

In carrying out the reaction, it is generally advisable to employ a molar excess of the acetate esters of ethylene glycol and, in any event, mol ratios of the glycol ester to terephthalic acid of at least 2/1 should be employed. The upper limit of the ratio of reactants depends merely upon practical consideration, with no significant benefit being achieved using ratios of the ethylene glycol esters to terephthalic acid in excess of about 30/1 although such higher ratios are quite operative. The desirable mol ratio is 2.5 to 20 mols, e.g. 4 to 20 mols, of glycol ester per mol of terephthalic acid, with the most preferred range of reactants being 3 to 15 mols, especially 5 to 10 mols, of ethylene glycol esters per mol of terephthalic acid. At the lower ratios of ethylene glycol esters to terephthalic acids, e.g. in the range of from 2/1 to 4/1 or even higher, oligomers tend to be formed along with the monomeric compounds. These oligomers are represented by the formula:

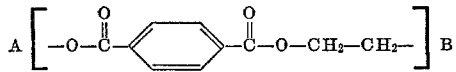

wherein A is

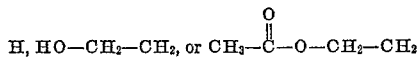

and wherein B is

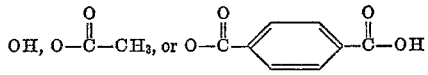

and wherein $m$ is an integer of 2 to 10. The oligomers can also be converted to high molecular weight polymers. It should generally be noted that the higher the ratio of ethylene glycol esters to terephthalic acid, the lower will be the amount of oligomer, if any, formed and also, the lower will be the average value of $m$ in the above presented structural formula of the oligomer formed.

When commercial terephthalic acid is used, rather than a purified form, the acidolysis reaction is advantageously carried out in an atmosphere of molecular hydrogen in the presence of a hydrogenation catalyst in order to hydrogenate the impurities normally associated with commercial terephthalic acid and which tend to form color bodies. Such hydrogenation, however, is an optional procedure and does not affect the basic acidolysis reaction leading to the production of the mono-(beta-acetoxyethyl) terephthalate of this invention. Any catalyst effective to catalyze the reduction of carbonyl groups with hydrogen may be employed, such as metallic nickel, Raney nickel, metallic platinum, metallic palladium, cobalt salts such as $Co(NO_3)_2$, palladium salts such as $Pd(NO_3)_2$ and $PdCl_2$, and the like, and these catalysts may be supported, e.g. on carbon, alumina, or other conventional support. Preferably metallic nickel is employed. The amount of hydrogenation catalyst employed is small, e.g. .001 to 20 wt. percent, preferably .01 to 1.0 wt. percent, based upon the terephthalic acid in the system.

When reduction with molecular hydrogen takes place during the reaction between the terephthalic acid and the ethylene glycol acetate ester, i.e. in situ in the acidolysis zone, it is preferred that the latter reaction be carried out at temperatures of 225° C. and above, but preferably not above 260° C., so that the reaction will proceed readily by thermal activation alone and the only catalyst that need be present in the system will be the hydrogenation catalyst. To effect the desired reduction, hydrogen is introduced into the reaction zone to provide a hydrogen partial pressure of 1 to 1000 p.s.i.a., preferably 5 to 200 p.s.i.a., and this hydrogen pressure is maintained throughout the reaction period. Ordinarily, reaction periods of 10 min. to 24 hrs., preferably 0.5 hr. to 10 hrs., are satisfactory, although shorter or longer periods may be employed if desired. It will be understood that combinations of extreme temperatures and pressures with large quantities of catalyst which, all acting together, may tend to favor nuclear hydrogenation of the terephthalic acid should preferably be avoided. This, however, is a matter of routine testing and, in general, higher temperatures should be used with lower pressures and lesser quantities of catalyst, and the greater amounts of catalyst are preferably employed under lower temperature and pressure conditions.

The reaction product issuing from the reaction zone, i.e. the acidolysis zone, is suitably treated by distillation and/or evaporation to separate lower boiling materials from the (beta-acetoxyethyl) terephthalates and, in turn, to separate the latter from less volatile polymeric materials, e.g. oligomers, should they be present. For this purpose, any convenient distillation and/or evaporation apparatus may be employed, but particularly good, reproducible results can be obtained if the preliminary distillation to remove lower boiling materials, principally liberated acetic acid and unreacted ethylene glycol esters, is carried out by a 2 or 3 stage flash distillation in a series of stills or, if the mixture is subjected to fractional distillation in a fractionating column. In this step the residual product largely comprises the (beta-acetoxyethyl) terephthalates and may contain oligomers and other polymeric forms of the ester and non-volatile materials. In the second separating step, when required, to recover the terephthalates, particularly good results can be obtained if the separation is effected by means of a so-called wiped film evaporator, a well-known evaporating apparatus. Any of the wide variety of wiped film devices available commercially can be used, such as those associated with the names of Rodney-Hunt, Luwa, Kontro Film, Pfaudler, or Buffalovac.

The product mono-(acetoxyethyl) terephthalate is readily recovered from the separated acidolysis product mixtures by the application of conventional techniques. For example, the mixture may be dissolved in an organic solvent and the resulting solution then extracted with an aqueous alkali metal base solution such as a sodium bicarbonate solution. The aqueous extract which now contains the components of the treated mixture having free carboxyl groups is then acidified until the aqueous solution becomes acid to litmus. The acidified solution is thereupon extracted with an organic solvent such as used in the first solubilizing step, and the product ester is recovered from the organic extract phase by distilling off the solvent. In the foregoing procedure, various solvents having boiling points within the range of 30 to 250° C., are advantageously employed such as esters, e.g. ethyl acetate, ethers, e.g. diethyl ether, halogenated hydrocarbons such as chloroform, methylene chloride, dichloro-ethane, and the like, substituted aromatic compounds, such as nitrobenzene, and like solvents. Particularly suitable are the halogenated hydrocarbons. Ratios of solvent to product mixture of 100:1 to 3:1 are generally suitable. In the base extraction step, any alkali metal base may be used such as sodium carbonate, sodium bicarbonate, potassium bicarbonate, sodium hydroxide, and lithium hydroxide, and the like, but preferably the alkali metal bicarbonates are employed. Sufficient base is used to react with all of the free acid groups in the mixture treated. Aqueous solutions of .01 molar to 1 molar concentration are preferred.

Alternatively, the product mono-(beta-acetoxyethyl) terephthalate is readily recovered by treating the mixture containing it with an aromatic solvent having a boiling point within the range of about 80 to about 160° C., such as benzene, toluene and ethyl benzene, suitably under reflux, followed by crystallization of the mother liquor, after filtering of the solution if it contains non-dissolved materials. Ratios of solvent to product mixture of 30:1 to 2:1 are generally suitable.

The mono-(beta-acetoxyethyl) terephthalate of the invention can also be produced by the oxidation of beta-acetoxyethyl-para-toluate in accordance with the following equation:

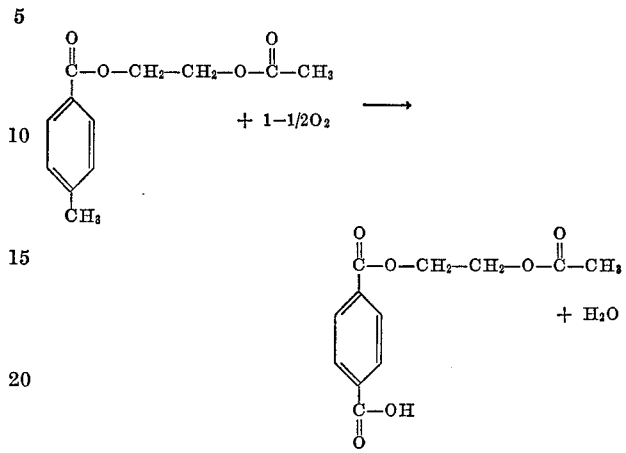

In effecting this reaction, temperatures broadly within the range of 80° C. to 300° C., desirably within the range of 110° C. to 200° C. and preferably within the range of 125° C. to 175° C. can be employed for the oxidation. Similarly, the molecular oxygen can be supplied in the form of air, or air diluted with a suitable inert gas (e.g. nitrogen, carbon dioxide, argon, helium, neon or $C_1$-$C_3$ paraffin hydrocarbons, or mixtures of such gases) can be employed. Likewise, high-purity oxygen (containing 85 mol percent or more of oxygen) can be employed as also can oxygen-containing gases of purity intermediate between that of air and that of high-purity oxygen.

Reaction pressure is in no way critical so long as it is sufficient to maintain a liquid phase. Since the reactants and products are relatively non-volatile, this presents no problem and atmospheric, subatmospheric or superatmospheric pressure can be employed for the oxidation with substantially equal ease. For economic reasons, pressures normally within the range of 5 to 1000 p.s.i.a., desirably within the range of 50 to 500 p.s.i.a. and preferably within the range of 100 to 300 p.s.i.a. would be used.

Times of reaction broadly within the range of 0.1 to 20 hours, desirably 0.5 to 15 hours and preferably 1 to 10 hours can be employed in the conduct of this reaction. The foregoing reaction can be conducted in the absence of catalytic materials and solvents are not necessary, although solvents of the character mentioned above in connection with the acidolysis reaction can be used if desired. Similarly, catalysts can be employed and suitable catalysts include polyvalent heavy metals such as cobalt and manganese and the catalysts are suitably introduced into the reaction system in a soluble form, e.g. as a salt of an organic acid, especially a lower alkanoic acid, such as acetic acid. The beta-acetoxyethyl-para-toluate used as the raw material for the reaction just described is readily prepared from para-toluic acid by using the acidolysis reaction of the first preparatory method discussed above but employing para-toluic acid, rather than terephthalic acid, as the acid component of the feed, and reacting the para-toluic acid with the mono- and/or the di-acetate of ethylene glycol under the conditions specified in the foregoing description of the acidolysis reaction.

The following examples are presented in order further to illustrate the invention without, however, being intended to limit the scope thereof. Unless otherwise indicated, all parts are by weight. The terephthalic acid designated as "crude" is the common commercial product.

EXAMPLE I

A mixture composed of 512 g. crude terephthalic acid, 2240 g. ethylene glycol diacetate, and 2 g. of a catalyst composed of nickel on kieselguhr (57% Ni) is charged to a 1 gal. stainless steel autoclave fitted with a stirrer. The system is pressurized with hydrogen and the temperature is brought to about 250° C. with the hydrogen pressure being about 150 p.s.i.g. The charge is stirred for 1.5 hours under these conditions and then the autoclave is cooled and the contents removed and introduced into a distillation unit operated at a temperature of 150° C. at a pressure of 1 mm. Hg and unreacted ethylene glycol diacetate and acetic acid are removed in this operation to leave a non-volatilized product containing the products of the reaction along with unreacted terephthalic acid which represents about 2% of the terephthalic acid in the charge. A 630 g. portion of the product is then introduced into a wiped film evaporator operated at a temperature of 250° C. and at a pressure of 4 mm. Hg and 60 wt. percent of the charge is removed as overhead leaving a bottoms product of the remaining 40 wt. percent. The overhead product is condensed and a 300 g. portion of it is mixed with 1500 g. toluene and the mixture refluxed for ½ hour to produce an opalescent solution in which the unreacted terephthalic acid remains substantially undissolved. The solution is suction-filtered to remove the undissolved terephthalic acid and the mother liquor from the filtration is crystallized by allowing it to cool to room temperature. Crystals in the form of plates are formed and are separated by filtration and dried in a vacuum oven (1 mm. Hg) at 80° C. The dried crystals (84 g.) have a melting point of 125° to 126° C.

An additional 9 g. of crystals can be recovered from the mother liquor obtained from the last-named filtration by subjecting this mother liquor to extraction with saturated aqueous sodium bicarbonate as described in Example II.

Figure 1A:
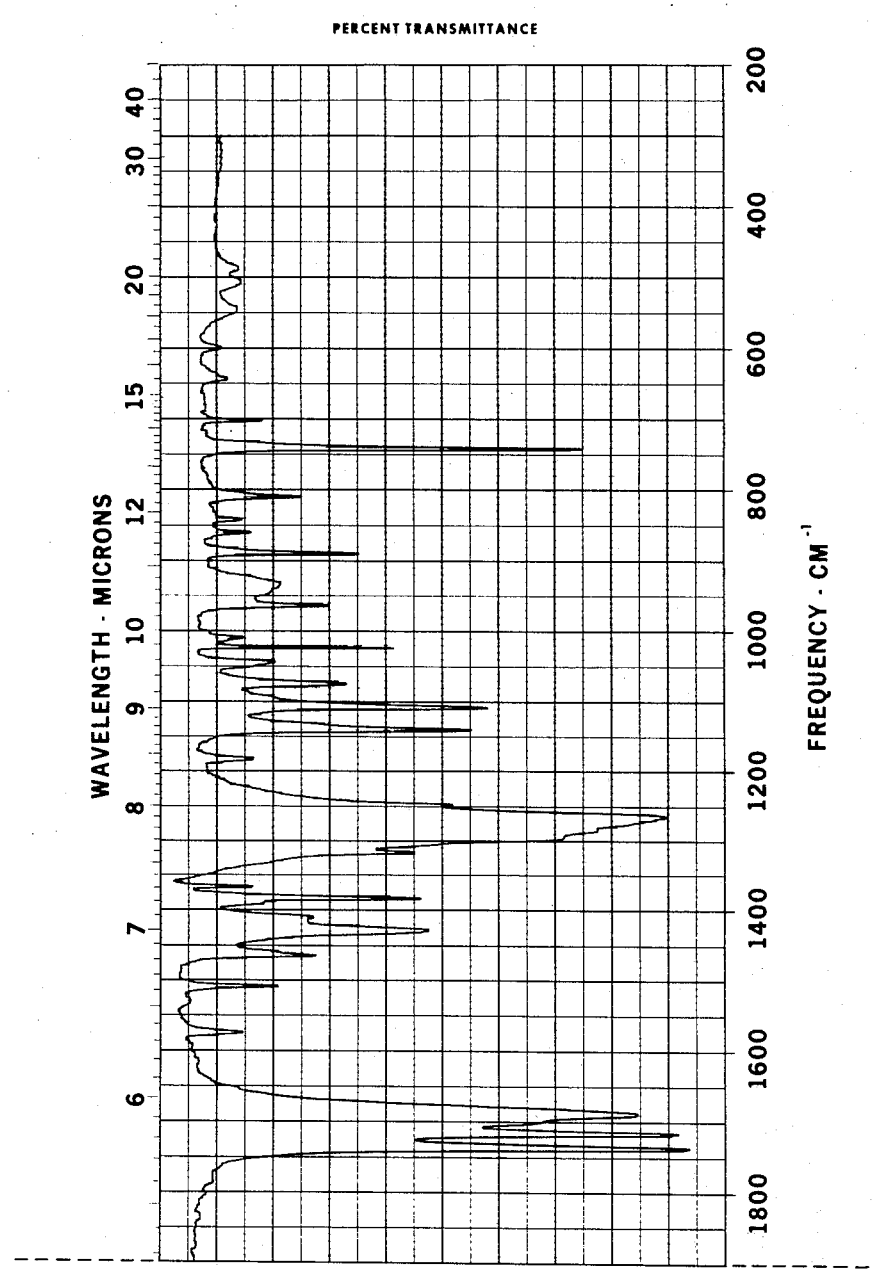

The crystals are further characterized by a neutralization equivalent of 3.97 millieq. per gram using 0.1 N NaOH and phenolphthalein (theoretical 3.96 millieq./g.). Elemental analysis of the crystals found C=57.20 wt. percent; H=4.76 wt. percent; O=37.97 wt. percent. The theoretical values for mono-(beta-acetoxyethyl) terephthalate are C=57.14 wt. percent; H=4.79 wt. percent; O=38.02 wt. percent. FIGS. 1 and 1A show the infra-red transmittance spectrum for the product over the range from 2.5 to 35 microns wavelength area. The spectrum was obtained using a Perkin-Elmer Model 621 grating infra-red spectrophotometer, using a solid state KBr wafer sample. The crystals are substantially insoluble in water, soluble in methylene chloride, and slowly soluble in ethanol.

EXAMPLE II

A mixture of 64 g. crude terephthalic acid, 280 g. ethylene glycol diacetate, 275 g. acetic acid and 0.5 g. of a catalyst composed of nickel on kieselguhr (57% Ni) is charged to a one-liter stainless steel autoclave fitted with a stirrer. The system is pressurized with hydrogen and the temperature brought to 250° C. with the system pressure then being about 250 p.s.i.g. The charge is stirred for 1.5 hours under these conditions, then the autoclave is cooled and the contents removed and introduced into a distillation unit defined by a rotovac operated at a temperature of 150° C. at a pressure of 1 mm. Hg. Unreacted ethylene glycol diacetate and acetic acid are removed in this operation to leave a non-volatilized product containing the products of the reaction along with small amounts of unreacted terephthalic acid. A 20 g. portion of this product mixture is dissolved in 200 ml. methylene chloride ($CH_2Cl_2$) and the solution extracted with three 75 ml. portions of saturated aqueous sodium bicarbonate solution. The aqueous extractants are combined and acidified with concentrated hydrochloride acid until acid to litmus. The acidified mixture is then extracted with three 75 ml. portions of methylene chloride and the organic phases from the extraction are dried over anhydrous sodium sulphate and the solvent removed by vaporization in a rotovac, leaving 6.2 g. of solid product. A mixed melting point taken with the product of Example I showed no depression.

EXAMPLE III

Two parts by weight of the product obtained in Example I are mixed with .001 part of phosphorous acid in a reaction vessel provided with a distillation head. The vessel is evacuated at room temperature and flushed with argon three times. The vessel is then placed in an oil bath maintained at 200° C. and heated with a constant flow of argon. After 15 minutes the temperature of the bath is raised to 220° C. and then to 240° C., after a second 15 minute interval, to 260° C. after a third 15 minute interval, and to 285° C. after a 30 minute interval. The mixture is then held at this temperature and under atmospheric pressures for 1.5 hrs. Then the pressure is reduced to 0.5 mm. Hg for 15 minutes and finally the mixture is heated for 2 hours at 0.2 mm. Hg. The polymeric product is found to have an intrinsic viscosity of 0.25 (at 29° C. in 60% phenol-40% sym-tetrachloroethane) and is suitable for use as a molding resin. Alternatively, the product of Example I is converted to bis-(beta-acetoxyethyl) terephthalate by acidolysis with ethylene glycol diacetate using the procedure of Example I but substituting the mono-(acetoxyethyl) terephthalate for the terephthalic acid. The bis-(beta-acetoxyethyl) terephthalate in turn (alone or in admixture with mono-(beta-acetoxyethyl( terephthalate) can be hydrolyzed with excess water e.g. at 200° C., to liberate at least some of the acetoxy moieties as acetic acid and the hydrolyzate is then polymerized with antimony trioxide (a conventional catalyst) to produce a high molecular weight polyethylene terephthalate suitable for use for fiber or film production.

EXAMPLE IV

To a sealed, glass-lined autoclave are charged 375 parts of glacial acetic acid and 20 parts of cobalt acetate tetrahydrate which is treated to insure that at least part of the cobalt is in the cobaltic valence state (this reduces induction time). To this mixture are then charged 100 parts of beta - acetoxyethyl - para - toluate. The mixture is then quickly heated to 130° C. and air at 220 p.s.i.a. is supplied to the reaction mixture at a rate of 0.35 liter per minute per hundred parts of material charged (gas volume measured at 0° C. and 760 mm. Hg). After 8 hours, air flow is terminated and reactor contents are cooled and analyzed. The effluent, even after cooling, is essentially liquid with only minor amounts of solids present. A conversion of 90% and a selectivity of 94% are obtained. Over 90% of the terephthalate moieties in the product are present as mono-(beta-acetoxyethyl) terephthalate, and the monoester product is readily purified by the procedure described in Example I. The recovered product corresponds to the product obtained in Examples I and II.

EXAMPLE V

To illustrate the effect of non-removal of acetic acid in the production of mono - (acetoxyethyl) terephthalate (MAT) from terephthalic acid and a glycol acetate, particularly upon the product distribution between MAT and bis-(acetoxyethyl) terephthalate (BAT), a series of runs is carried out with the following results. The basic feed comprises ethylene glycol diacetate and terephthalic acid in the mol ratio of 5:1.

| Acid added (mols per mol of terephthalic acid) | Acid removal | Monomeric product distribution, mol percent | |
|---|---|---|---|
| | | MAT | BAT |
| None | Yes | | 100 |
| Do | No | 30 | 70 |
| 4 | No | 45 | 55 |
| 8 | No | 55 | 45 |

The embodiments of the invention in which an exclusive property is claimed are defined as follows:

1. Mono-(beta-acetoxyethyl) terephthalate.
2. A method of recovering mono-(beta-acetoxyethyl) terephthalates from an admixture of said mono-(beta-acetoxyethyl) terephthalate with bis-(beta-acetoxyethyl) terephthalate which comprises dissolving said terephthalate admixture in an aromatic hydrocarbon having a boiling point in the range of about 80° C. to about 160° C. and crystallizing said mono-(beta-acetoxyethyl) terephthalate from the resulting solution.
3. A process as defined in claim 2 wherein said solution is filtered prior to crystallization.

References Cited

UNITED STATES PATENTS 3,576,841  4/1971  Larkin  260—475 P

FOREIGN PATENTS 760,125  10/1956  Great Britain  260—475 P
742,174  6/1970  Belgium.

JAMES A PATTEN, Primary Examiner

E. J. SKELLY, Assistant Examiner

U.S. Cl. X.R.

260—475 PR